US012215640B2

(12) United States Patent
Gerstner et al.

(10) Patent No.: US 12,215,640 B2
(45) Date of Patent: Feb. 4, 2025

(54) SYSTEMS AND METHODS FOR PURGING FUEL IN A COMBUSTION ENGINE

(71) Applicant: Caterpillar Inc., Peoria, IL (US)

(72) Inventors: Michael David Gerstner, Peoria, IL (US); Arnold Myoungjin Kim, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 25 days.

(21) Appl. No.: 18/322,145

(22) Filed: May 23, 2023

(65) Prior Publication Data

US 2024/0392730 A1 Nov. 28, 2024

(51) Int. Cl.
*F02D 19/06* (2006.01)
*F02D 23/02* (2006.01)
*F02D 41/00* (2006.01)

(52) U.S. Cl.
CPC ..... *F02D 19/0621* (2013.01); *F02D 19/0613* (2013.01); *F02D 23/02* (2013.01)

(58) Field of Classification Search
CPC ............. F02D 19/0621; F02D 19/0613; F02D 19/081; F02D 23/02; F02D 41/00; F02D 2200/0007; F02D 2200/0406; F02D 2200/0602
See application file for complete search history.

(56) References Cited

U.S. PATENT DOCUMENTS 7,428,895 B2 9/2008 Leone et al.
8,006,677 B2 * 8/2011 Williams ............ F02D 19/0694 123/575
8,342,158 B2 1/2013 Ulrey et al.
8,909,457 B2 12/2014 Puckett et al.
10,066,585 B2 * 9/2018 Dearth ............... F02M 21/0218
10,907,553 B2 * 2/2021 Chiu ................... F02D 19/0615
2007/0261678 A1 11/2007 Turner et al.
2011/0155102 A1 6/2011 Ten Broeke

FOREIGN PATENT DOCUMENTS

CN 101382089 A 3/2009
CN 211975165 U 11/2020
CN 113047996 A 6/2021
EP 1432896 B1 2/2008
EP 2912293 B1 1/2018
EP 2906799 B1 3/2019

OTHER PUBLICATIONS

Written Opinion and International Search Report for Int'l. Patent Appln. No. PCT/US2024/024174, mailed Jul. 1, 2024 (10 pgs).

* cited by examiner

*Primary Examiner* — Grant Moubry
(74) *Attorney, Agent, or Firm* — Lee & Hayes, P.C.

(57) ABSTRACT

An internal combustion engine system is described herein. The system uses compressed air from a compressor to purge at least a portion of a fuel from an internal combustion engine. During a purge operation, a controller opens and closes an injector of the fuel to be purged to allow the compressed air from the compressor to push at least a portion of the fuel back into a fuel tank through the injector. The controller deenergizes a fuel pump that pumps the fuel to be purged, allowing the pressure of the fuel that is to be purged to reduce to a pressure that allows the compressed air to flow into the injector.

20 Claims, 5 Drawing Sheets

SYSTEMS AND METHODS FOR PURGING FUEL IN A COMBUSTION ENGINE

TECHNICAL FIELD

The present disclosure relates to internal combustion engines, and more particularly, to using compressed air from a compressor to purge a fuel from a combustion engine.

BACKGROUND

Internal combustion engines are widely used in various industries. Internal combustion engines can operate on a variety of different liquid fuels, gaseous fuels, and various blends. Spark-ignited engines employ an electrical spark to initiate combustion of fuel and air, whereas compression ignition engines typically compress gases in a cylinder to an autoignition threshold such that ignition of fuel begins without requiring a spark. In an attempt to reduce greenhouse gases (GHG), some endeavors have been made to change or replace a portion of the primary fuel used in combustions engines from fuels such as diesel to alcohol fuels such as ethanol and methanol, or combinations of these fuels. However, the use of fuels such as ethanol and methanol can cause some issues. For example, it may be preferable or required to purge at least a portion of the fuel from one or more parts of a combustion engine when the combustion engine is shutdown.

Some efforts have been made to purge a fuel from engine components. For example, U.S. Pat. No. 8,342,158 to Ulrey et. al ("the '158 patent") describes one such effort. The '158 patent describes a combustion engine that uses a liquid fuel and a gaseous fuel. To purge the engine of one fuel, the liquid fuel, when transitioning to a second fuel, the gaseous fuel, the gaseous fuel is injected into the injectors for the liquid fuel. Because of the spatial orientation of the injector previously receiving the liquid fuel, as described in the '158 patent, the gaseous fuel collects in a space of the injector, thereby forcing the liquid fuel to move in a downward direction. The pressure built by the collection of the gaseous fuel purges the liquid injector of the liquid fuel by pushing the liquid fuel back into a storage tank used to store the liquid fuel. However, the system (and process) described in the '158 patent suffers from some shortfalls. For example, the system of the '158 patent is limited to systems in which one of the fuels is gaseous. In another example, because the gaseous fuel and the liquid fuel come into contact with each other, the fuels and their respective delivery systems may be contaminated by the other fuel, meaning the gaseous fuel delivery system may receive a portion of the liquid fuel.

Some examples of the present disclosure are directed to overcoming these and other deficiencies of such systems.

SUMMARY

One aspect of the presently disclosed subject matter describes an internal combustion engine system having an internal combustion engine configured to combust diesel fuel and a second fuel, a compressor configured to provide a compressed intake air to an intake manifold of the internal combustion engine for combustion within a cylinder of the internal combustion engine, a first fuel pump configured pump a first fuel from a first fuel tank to a first fuel injector, providing the first fuel, when the first fuel injector is open, to the cylinder, a second fuel pump configured to pump a second fuel from a second fuel tank to a second fuel injector, providing the second fuel, when the second fuel injector is open, to the intake manifold and into the cylinder for combustion, a controller configured to receive a purge event notice and upon receiving the purge event notice, detect when a differential pressure between the second fuel and the compressed intake air is at or below a value, wherein the value is calculated as a difference between a pressure of the second fuel prior to the second fuel injector and a pressure of the compressed intake air, and open the second fuel injector when the differential pressure between the second fuel and the compressed intake air is at or below a value to allow the compressed intake air to perform a purge operation to purge at least a portion of the second fuel from the internal combustion engine into the second fuel tank.

In an additional aspect, the presently disclosed subject matter describes a controller for controlling a purge operation of an internal combustion engine, the controller having a memory storing computer-executable instructions, and a processor in communication with the memory, the computer-executable instructions causing the processor to perform acts comprising receiving a purge event notice of the internal combustion engine configured to combust a first fuel, a second fuel, or mixtures thereof, wherein the purge event notice is an indication to the controller to cause the purging of at least a portion of the second fuel from the internal combustion engine, determining a differential pressure between the second fuel and a compressed intake air is at or below a value, wherein the value is calculated as a difference between a pressure of the second fuel prior to the second fuel injector and a pressure of the compressed intake air, and upon determining that the differential pressure is at or below the value, performing a purge operation by opening a second fuel injector to allow the compressed intake air to purge at least a portion of the second fuel from the internal combustion engine into a second fuel tank.

In a still further aspect, the presently disclosed subject matter describes a method of purging an internal combustion engine including receiving a purge event notice of the internal combustion engine configured to combust a first fuel, a second fuel, or mixtures thereof, wherein the purge event notice is an indication to the controller to cause the purging of at least a portion of the second fuel from the internal combustion engine, determining a differential pressure between the second fuel and a compressed intake air is at or below a value, wherein the value is calculated as a difference between a pressure of the second fuel prior to the second fuel injector and a pressure of the compressed intake air, and upon determining that the differential pressure is at or below the value, performing a purge operation by opening a second fuel injector to allow the compressed intake air to purge at least a portion of the second fuel from the internal combustion engine into a second fuel tank.

DETAILED DESCRIPTION

Figure 1:
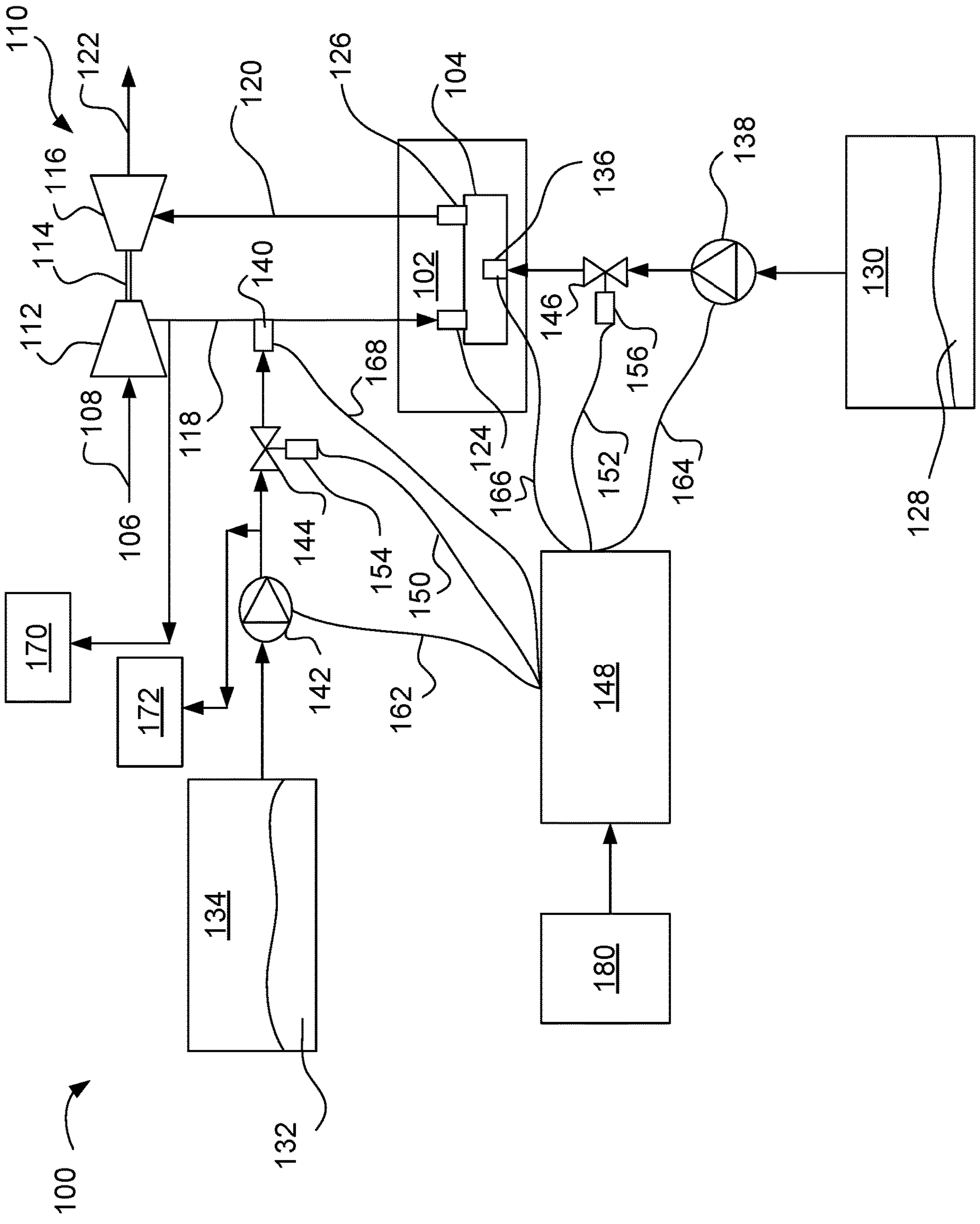
FIG. 1 illustrates an internal combustion engine system, in accordance with various examples of the presently disclosed subject matter.

Wherever possible, the same reference numbers will be used throughout the drawings to refer to the same or like parts. FIG. 1 illustrates an internal combustion engine system 100, in accordance with various examples of the presently disclosed subject matter. The internal combustion engine system 100 includes an internal combustion engine 102 with a plurality of combustion cylinders (not shown), with illustrative combustion cylinder 104 identified in FIG. 1. However, it should be noted that the internal combustion engine 102 may have any number of combustion cylinders. The combustion cylinder 104 is associated with a piston (not shown) movable between a top dead center position and a bottom dead center position in a generally conventional manner, typically in a four-stroke engine cycle, though other combustions cycles may be used and are considered to be within the scope of the presently disclosed subject matter. The pistons will be coupled with a crankshaft (not shown) rotatable to provide torque for purposes of vehicle propulsion, operating a generator for production of electrical energy, or in still other applications such as operating a compressor, a pump, or various other types of equipment.

Air 106 for combustion is provided through air intake 108 into a turbocharger 110. The turbocharger 110 includes a compressor 112, a shaft 114, and a turbine 116. The compressor 112 includes a series of fans or blades (not shown) internal to the compressor 112 that compress the air 106 into compressed intake air 118 from air 106 pressure to a higher pressure for combustion by the internal combustion engine 102. The fans of the compressor 112 are rotatably attached to the shaft 114, so that when the shaft 114 rotates, the fans of the compressor 112 rotate. The shaft 114 is rotated by internal fans of the turbine 116. The turbine 116 receives combustion exhaust 120 from the internal combustion engine 102. The combustion exhaust 120 is at a first pressure that, when received into the turbine 116, causes the fans of the turbine 116 to rotate, rotating the shaft 114, and thus, rotating the fans of the compressor 112. The turbine 116 reduces the pressure of the combustion exhaust 120 from the first pressure to the second pressure, leaving the turbine 116 as engine exhaust 122. Intercoolers and other heat exchange mechanisms (not shown) may be used to cool various fluids moving the internal combustion engine system 100, such as, but not limited to, the compressed intake air 118. Further, compressed air may be provided using technologies other than the compressor 112 of the turbocharger 110. For example, but not by way of limitation, a supercharger, compressor pump, or battery-operated compressor may be used and are considered to be within the scope of the presently disclosed subject matter.

The compressed intake air 118 is received into the cylinder 104 of the internal combustion engine 102 through intake valve 124. When open, the compressed intake air 118 enters the cylinder 104, and when closed, the compressed intake air 118 is prevented from entering the cylinder 104. In an exemplary four stroke engine cycle, the intake valve 124 will be open during the "air intake" cycle, and will be closed during the combustion, power, and exhaust cycles. During the exhaust cycle, the combustion exhaust 120 exits the cylinder 104 through exhaust valve 126. In an exemplary four stroke engine cycle, the exhaust valve 126 will be open during the "exhaust" cycle, and will be closed during the air intake, combustion, and power cycles.

The internal combustion engine 102 is fueled by a first fuel 128 stored in a first fuel tank 130 and a second fuel 132 stored in a second fuel tank 134. The first fuel 128 may include a higher cetane/lower octane liquid fuel, and the second fuel 132 may include a lower cetane/higher octane liquid fuel. The terms "higher" and "lower" in this context may be understood as relative terms in relation to one another. Thus, the first fuel 128 may have a higher cetane number and a lower octane number than a cetane number and an octane number of the second fuel 132. The first fuel 128 might include a diesel distillate fuel, dimethyl ether, biodiesel, Hydrotreated Vegetable Oil (HVO), Gas to Liquid (GTL) renewable diesel, any of a variety of liquid fuels with a cetane enhancer, or still another fuel type. The second fuel 132 may include an alcohol fuel such as methanol or ethanol, Naptha, for example, or still other fuel types such as isopropyl alcohol, n-propyl alcohol, and t-butyl alcohol. For the purposes of FIG. 1, the first fuel 128 is described as diesel fuel and the second fuel 132 is described as methanol, though as noted above, the presently disclosed subject matter may be used with other fuel types.

In various examples, the first fuel 128 is pumped into a first fuel injector 136 using first fuel pump 138. The first fuel pump 138 is in fluidic communication with the first fuel tank 130 and pumps the first fuel 128 to the first fuel injector 136. The first fuel injector 136 is a valve that, when opened, allows the first fuel 128 to enter the cylinder 104 for combustion. It should be noted, however, that the first fuel 128 may be provided to the cylinder 104 for combustion using other injection technologies. The presently disclosed subject matter is not limited to any particular method of injecting the first fuel 128 into the cylinder 104. The second fuel 132 is supplied to the internal combustion engine 102 through second fuel injector 140, which injects the second fuel 132 into the compressed intake air 118, illustrated in more detail in FIG. 2, below.

Figure 2:
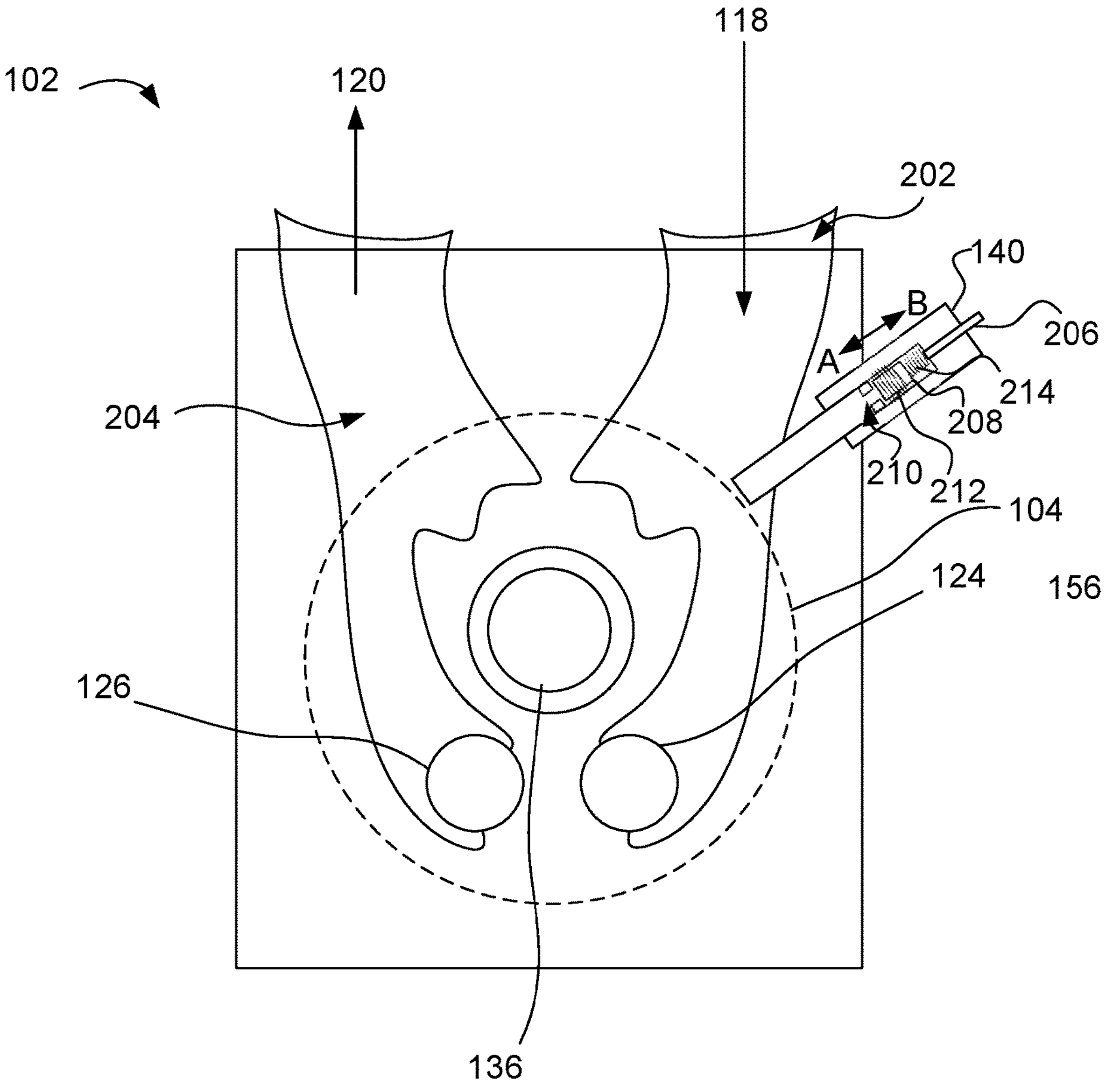
FIG. 2 is an illustration of a first fuel injector, a second fuel injector, an intake valve, a cylinder, and an exhaust valve of an internal combustion engine, in accordance with various examples of the presently disclosed subject matter.

FIG. 2 is an illustration of the first fuel injector 136, the second fuel injector 140, the intake valve 124, the cylinder 104, and the exhaust valve 126 of the internal combustion engine 102, in accordance with various examples of the presently disclosed subject matter. The compressed intake air 118 enters the internal combustion engine 102 through an intake manifold 202. When open, the compressed intake air 118 enters the cylinder 104 through the intake valve 124. The combustion exhaust 120 exits the cylinder 104 through an exhaust manifold 204. The first fuel 128 enters the cylinder 104 through the first fuel injector 136. The second fuel 132 is injected into the intake manifold 202 for delivery into the cylinder 104 when the intake valve 124 is open. The second fuel 132 is received into the second fuel injector 140 through injector inlet 206. A fuel valve 208 moves in a direction along axis AB to permit or abate the flow of the second fuel 132 through port inlet 210 by blocking or closing the port inlet 210.

The position of the fuel valve 208 is controlled by windings 212. The fuel valve 208 is configured to be sensitive to magnetic fields so that when energized, the windings 212 create an electromagnetic field that moves the fuel valve 208 from position A to position B along the AB axis, thus opening the fuel valve 208 to allow the second fuel 132 to move through the port inlet 210. The windings are energized by the injector signal 168. To stop the flow of the second fuel 132 through the port inlet 210, the controller 148 removes the injector signal 168, thus deenergizing the windings 212, allowing the fuel valve 208 to move from position B to position A along the AB axis. A spring 214 provides a biasing force to assist the movement of the fuel valve 208 from position B to position A along the AB axis.

Returning to FIG. 1, a second fuel pump 142 is in fluidic communication with the second fuel 132 stored in the second fuel tank 134, increases the pressure of the second fuel 132 at or above the pressure of the compressed intake air 118 so that the second fuel 132 flow moves from the second fuel pump 142, when operating, into the compressed intake air through the second fuel injector 140. Flow of the second fuel 132 into the second fuel injector 140 is abated using a second fuel cutoff valve 144. Similarly, the flow of the first fuel 128 into the first fuel injector 136 is abated using first fuel cutoff valve 146.

To control the flow of the first fuel 128 and the second fuel 132 into the internal combustion engine 102, a controller 148 is provided. The controller 148 can be an engine control unit (ECU) or engine control module (ECM), or a module of the ECU or ECM, of the internal combustion engine 102. The controller 148 controls the amount and timing of the first fuel 128 and the second fuel 132 entering the internal combustion engine 102. The controller 148 includes one or more processors and memory storing therein instructions that, when executed by the processor of the controller 148, cause the controller 148 to control the amount and timing of the first fuel 128 and the second fuel 132 entering the internal combustion engine 102, explained in more detail in FIG. 5, below.

Returning to FIG. 1, during operation, the controller 148 opens and closes the second fuel cutoff valve 144 and the first fuel cutoff valve 146 using cutoff signals 150 and 152, respectively. The cutoff signal 150 is used to control a second fuel actuator 154. The second fuel actuator 154 opens and closes the second fuel cutoff valve 144. Similarly, the cutoff signal 152 is used to control a first fuel actuator 156. The first fuel actuator 156 opens and closes the first fuel cutoff valve 146. When closed, the first fuel cutoff valve 146 and the second fuel cutoff valve 144 prevent the flow of their respective fuels. The first fuel cutoff valve 146 and the second fuel cutoff valve 144 may be various types of valves, such as a gate valve that either permits or abates the flow of fluid or a throttle valve that, depending on the position of the throttle valve, adjusts the flow rate of the fluid. The presently disclosed subject matter is not limited to any particular type of valve for the first fuel cutoff valve 146 and the second fuel cutoff valve 144. The controller 148 further turns on and turns off (i.e., energizes and deenergizes) the second fuel pump 142 using second pump control signal 162 and the first fuel pump 138 using first pump control signal 164.

The controller 148 opens and closes the first fuel injector 136 using injector signal 166. The injector signal 166, when active, causes the first fuel injector 136 to open to allow the first fuel 128 to enter the cylinder 104. The injector signal 166, when deactivated, causes the first fuel injector 136 to close, preventing the first fuel 128 from entering the cylinder 104. The controller 148 further opens and closes the second fuel injector 140 using injector signal 168. The injector signal 168, when active, causes the second fuel injector 140 to open, allowing the second fuel 132 to enter the compressed intake air 118. In some examples, the second fuel injector 140 is opened proximate to or substantially at the same time the intake valve 124 is open. When the intake valve is open, the compressed intake air 118 will be flowing into the cylinder 104, providing a flow of moving fluid that increases a mixing of the second fuel 132 into the compressed intake air 118. The injector signal 168, when deactivated, causes the second fuel injector 140 to close, preventing the second fuel 132 from entering the compressed intake air 118. In some examples, the second fuel injector 140 is closed proximate to or substantially during the time the intake valve 124 is closed.

As noted above, in some examples, it may be preferable or required to purge at least a portion of the second fuel 132 from one or more components of the internal combustion engine 102. To purge at least a portion of the second fuel 132 from one or more components of the internal combustion engine 102, the internal combustion engine system 100 uses the compressed intake air 118. As discussed above, during the air intake cycle of the internal combustion engine, the second fuel injector 140 and the intake air 118 are open, allowing the second fuel 132 to move into the compressed intake air 118 for delivery to the cylinder 104 of the internal combustion engine 102. When the intake air 118 is closed, the second fuel injector 140 is normally closed. However, during a purge cycle, the controller 148 issues the injector signal 168 to open the second fuel injector 140 to allow the compressed intake air 118 to move into the second fuel injector 140 and towards the second fuel cutoff valve 144, and ultimately into the second fuel tank 134. However, during the operation of the internal combustion engine 102, the second fuel pump 142 provides enough outlet pressure that the pressure of the second fuel 132 moving into the compressed intake air 118 is greater than the pressure of the compressed intake air 118. If the second fuel injector 140 is opened by the controller 148 during a purge operation when the pressure of the second fuel 132 is greater than the pressure of the compressed intake air 118, the compressed intake air 118 could not flow into the second fuel injector 140 to purge.

Therefore, to reduce the pressure of the second fuel 132 to allow the compressed intake air 118 to enter the second fuel injector 140 to purge, the controller 148 issues the second pump control signal 162 to deenergize the second fuel pump 142. With the second fuel pump 142 deenergized, which pressurized the second fuel 132, the pressure of the second fuel 132 is reduced to a level below the compressed intake air 118. Having the second fuel 132 at a pressure less than the compressed intake air 118 allows the compressed intake air 118, when the second fuel injector 140 is open, to push portions of the remaining second fuel 132 back through the second fuel injector 140, through the second fuel cutoff valve 144, the second fuel pump 142 and into the second fuel tank 134.

Because the differential pressure between the second fuel 132 and the compressed intake air 118 provides for the flow of the compressed intake air 118 into the second fuel injector 140 to purge the second fuel, the internal combustion engine system 100 also includes and intake air sensor, an intake pressure sensor 170, and second fuel pressure sensor 172. The intake pressure sensor 170 and second fuel pressure sensor 172 are in communication with the controller 148. The intake pressure sensor 170 provides a communication to the controller 148 indicating the pressure of the compressed intake air 118. The second fuel pressure sensor 172 provides a communication to the controller 148 indicating the pressure of the second fuel 132 prior to the second fuel injector 140. A used herein, "prior" is the pressure of the second fuel 132 as the second fuel 132 enters the second fuel injector 140. The controller 148 receives the pressures and determines the differential pressure between the pressures. Once the differential pressure is at or below a value, then the controller 148 will issue the injector signal 168 to open the second fuel injector 140. For example, the pressure of the compressed intake air 118 may be around 20 psi to 22 psi, while the pressure of the second fuel 132 prior to the second fuel injector 140 may be from 100 psi to 200 psi, indicating a positive differential pressure of around 80 psi as measured by the pressure of the second fuel 132 prior to the second fuel injector 140 minus the pressure of the compressed intake air 118. Once the pressure of the second fuel 132 prior to the second fuel injector 140 is reduced to be at or below the pressure of the compressed intake air 118, the differential pressure is zero or a negative value, meaning that, upon opening the second fuel injector 140, the compressed intake air 118 will flow into the second fuel injector 140 to purge the second fuel 132.

The differential pressure between the second fuel 132 prior to the second fuel injector 140 and the compressed intake air 118 can be used by the controller 148 to determine when to open the second fuel injector 140, as discussed above. However, there may be other conditions associated with the internal combustion engine 102 that may also affect whether or not the controller 148 opens the second fuel injector 140. For example, the controller 148 may use the operational condition of the second fuel pump 142 as an indication that a purge operation should proceed. The controller 148 can receive an indication that the second fuel pump 142 has ceased operation or has shutdown unexpectedly. This may indicate a fault condition, requiring a purging of the internal combustion engine system 100 of the second fuel 132 in anticipation, for example, of maintenance to be done. In another example, the controller 148 can receive an engine shutdown signal 180 indicating that the internal combustion engine 102 has or will commence shutting down. The shutdown signal 180 causes the controller 148 to turn off the second fuel pump 142 to commence reducing the pressure of the second fuel 132 prior to the second fuel injector 140. The timing of the controller 148 opening and closing the intake valve 124 and the second fuel injector 140 is described in more detail in FIG. 3.

Figure 3:
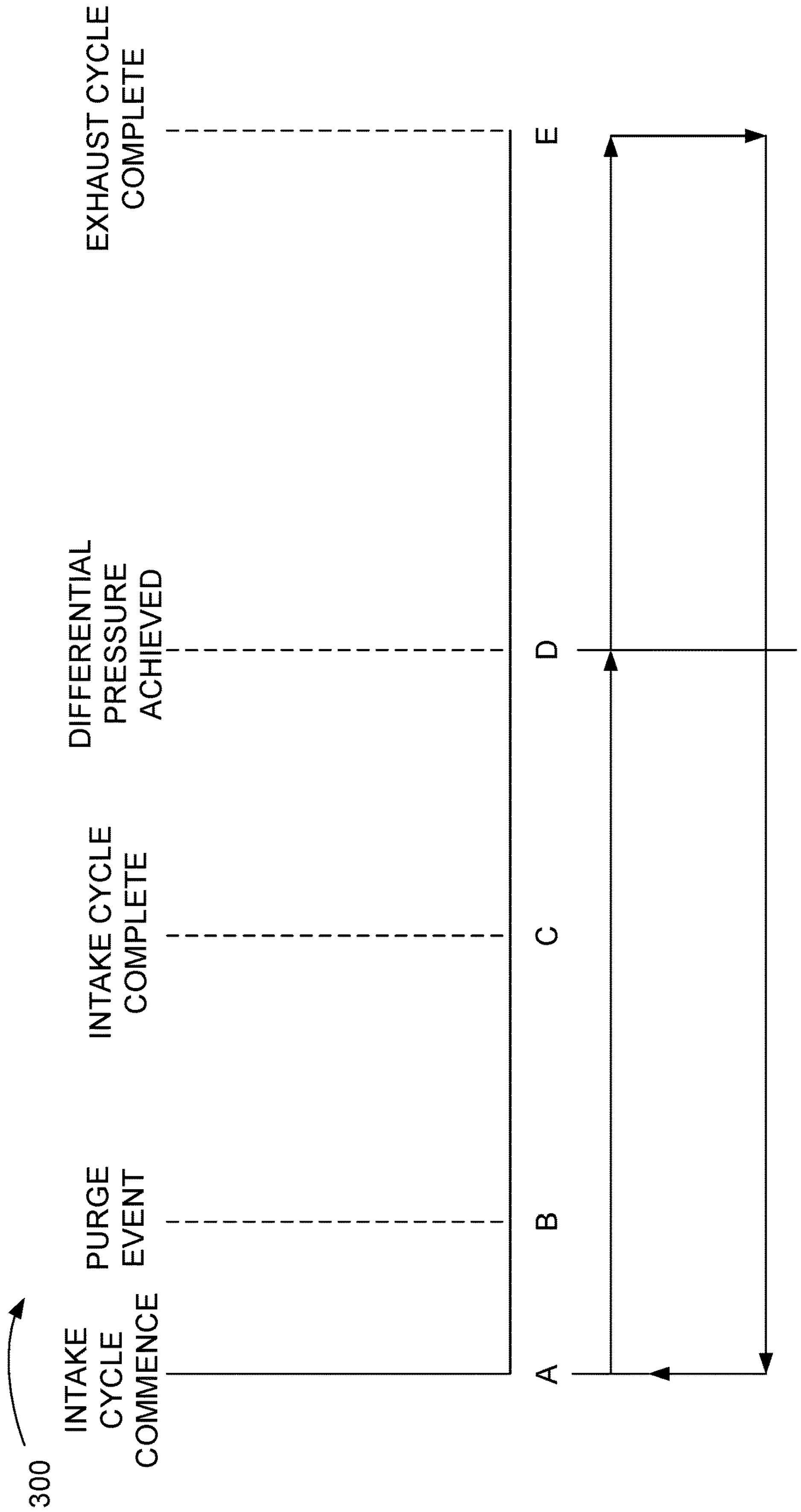
FIG. 3 is a timing diagram that illustrates an example purge process timing, in accordance with various examples of the presently disclosed subject matter

FIG. 3 is a timing diagram 300 that illustrates an example purge process timing, in accordance with various examples of the presently disclosed subject matter. During a purge process, it may be desirable to have the second fuel injector 140 closed during an air intake cycle of the internal combustion engine 102 while the purge is occurring. This may be desirable for several reasons. For example, if the second fuel injector 140 is open during an air intake cycle, meaning the intake valve 124 is open to allow the compressed intake air 118 to flow into the cylinder 104, a portion of the compressed intake air 118 may flow into the open second fuel injector 140 rather than the cylinder 104, reducing the amount of the compressed intake air 118 available for combustion.

Although a purge event is detected by the controller 148 at time B, because the intake cycle occurs from time A to time C, the controller 148 does not open the second fuel injector 140. It should be noted that when the second fuel 132 is being used, the controller 148 would open the second fuel injector 140 during the intake cycle. However, during a purge operation, the second fuel 132 would not be used, and thus, the second fuel injector 140 would remain closed. Further, even after the air intake cycle is completed at time C, meaning the intake valve 124 is closed, the controller 148 still maintains the second fuel injector 140 because the differential pressure between the second fuel 132 and the compressed intake air 118 is above a certain value, as discussed above in FIG. 1. At time D, the controller 148 detects that the differential pressure between the second fuel 132 and the compressed intake air 118 is at or below a value, and therefore, the controller 148 causes the second fuel injector 140 to open, allowing the compressed intake air 118 to enter the second fuel injector 140, purging the second fuel 132. The controller 148 maintains the second fuel injector 140 open until time E, where the exhaust cycle completes, meaning that the cycle returns to the air intake cycle. The controller 148 may close the second fuel injector 140 before time E if the purge is complete. Because the air intake cycle causes the air intake valve 124 to open, the controller 148 closes the second fuel injector 140. The process by which the controller 148 opens and closes the second fuel injector 140 based on engine conditions is illustrated in more detail in FIG. 4.

Figure 4:
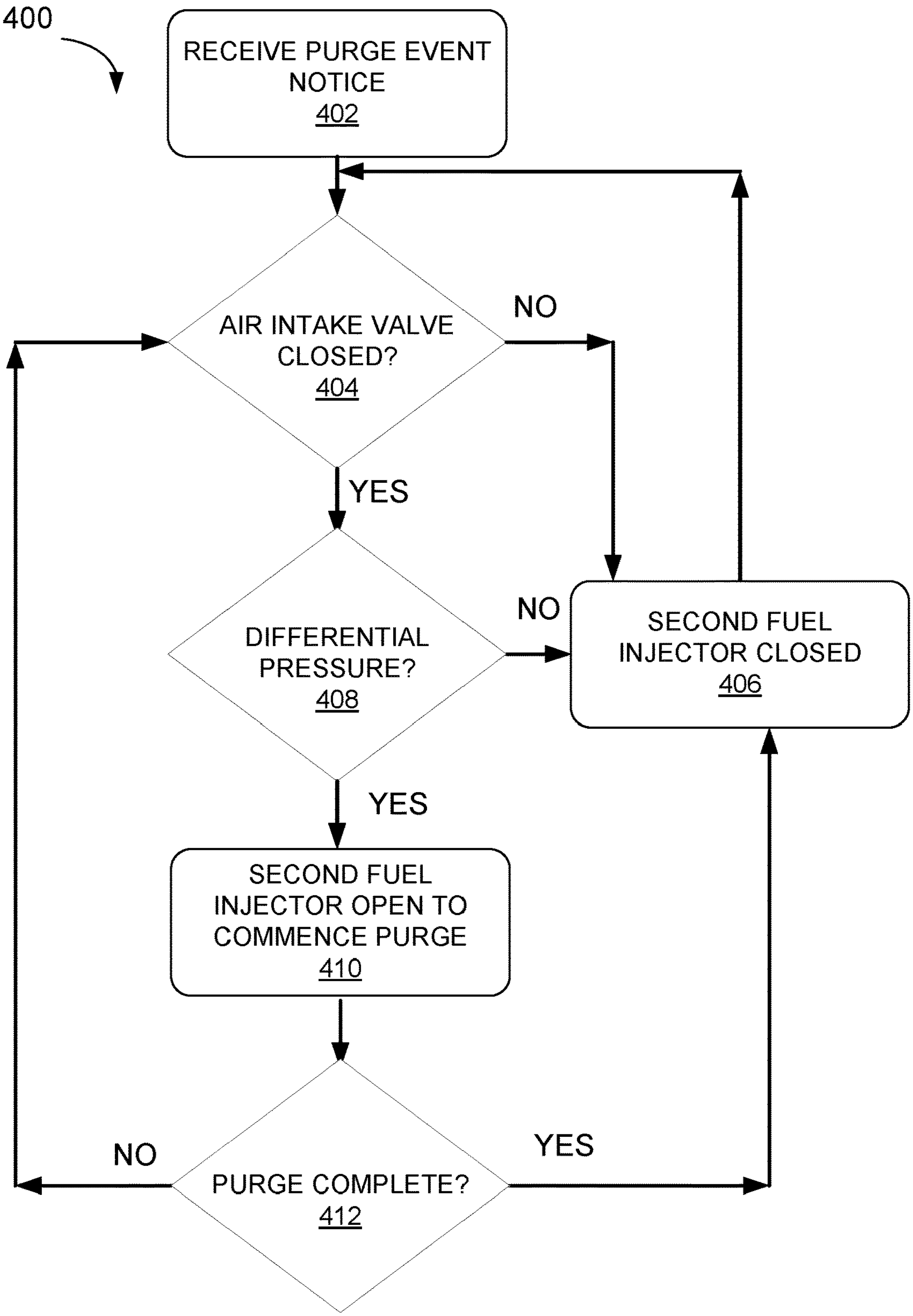
FIG. 4 illustrates a method for operating an internal combustion engine in which a controller controls a purge operation, in accordance with various examples of the presently disclosed subject matter.

FIG. 4 illustrates a method 400 for operating the internal combustion engine 102 in which the controller 148 opens and closes the second fuel injector 140, in accordance with various examples of the presently disclosed subject matter. The method 400 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The method 400 commences at step 402, where the controller 148 receives a purge event notice. A purge event notice is information provided to the controller 148 informing the controller 148 to commence purge operations. Examples of purge event notices are described in FIG. 1. For example, the controller 148 can receive the engine shutdown signal 180 indicating that the internal combustion engine 102 has or will commence shutting down, indicating a potential purge operation is to be completed by the controller 148. In another example, the controller 148 may use the operational condition of the second fuel pump 142 as an indication that a purge operation should proceed. The controller 148 can receive an indication that the second fuel pump 142 has ceased operation or has shutdown unexpectedly. This may indicate a fault condition, requiring a purging of the internal combustion engine system 100 of the second fuel 132 in anticipation, for example, of maintenance to be done.

At step 404, the controller 148 checks to see if the air intake valve 124 is closed. As discussed above, to commence a purge operation, the controller 148 generally checks for two conditions of the engine. The first condition is whether or not the air intake valve 124 is open. The reason is that while the air intake valve 124 is open, the internal combustion engine 102 is in the air intake cycle. If a purge operation commences during this cycle, the internal combustion engine 102 may not receive a desired or required amount of air for combustion because some of the air may be diverted through the second fuel injector 140. Thus, to reduce the effect on the operating conditions of the internal combustion engine 102, the controller 148 may not open the second fuel injector 140. It should be noted, however, that in some conditions, the controller 148 may maintain the second fuel injector open 140 even during the air intake cycle. Therefore, the presently disclosed subject matter does not require that the air intake valve 124 be closed during a purge operation. This can be especially true if the compressed intake air 118 is of sufficient volume to provide both the air for combustion and the air for the purge operation.

At step 406, if the controller 148 determines that the air intake valve 124 is not closed (step 404: No), the controller 148 maintains the second fuel injector 140 closed. However, as noted above, in some examples, the method 400 may proceed with the air intake valve 124 opened.

At step 408, if the controller 148 determines that the air intake valve 124 is closed (step 404: Yes), the controller 148 determines if the differential pressure between the second fuel 132 and the compressed intake air 118 is at or below a value. As noted above, in some examples, if the differential pressure is above a value, the second fuel 132 may still be pumped into the internal combustion engine 102, preventing the commencement of a purge operation. In order for the compressed air intake to flow into the second fuel injector to purge, the pressure of the second fuel should be lower than the compressed air intake.

At step 406, if the controller 148 determines that the differential pressure between the second fuel 132 and the compressed intake air 118 is above a value (step 408: No), the controller 148 maintains the second fuel injector 140 closed.

At step 410, if the controller 148 determines that the differential pressure between the second fuel 132 and the compressed intake air 118 is at or below a value (step 408: Yes), the controller opens the second fuel injector 140 to allow the compressed intake air 118 to move into the second fuel injector 140, pushing the second fuel back into the second fuel tank.

At step 412, the controller 148 determines if the purge operation is complete. In some examples, the controller 148 can determine that the second fuel injector 140 has been open for a period of time previously determine sufficient to provide for a purge operation. The presently disclosed subject matter is not limited to any specific technology used by the controller 148 to determine when a purge operation is complete.

At step 404, the controller 148 determines that the purge operation is not complete (step 412: No) and determines if the air intake valve is open. At step 406, the controller 148 determines that the purge operation is complete (step 412: Yes) and cause the second fuel injector 140 to close, ceasing the purge operation. In some examples, once the purge operation is complete, the controller 148 may isolate the second fuel 132 from the internal combustion engine 102 by closing the second fuel cutoff valve 144 to fluidically disconnect the second fuel 132 from the internal combustion engine 102.

Figure 5:
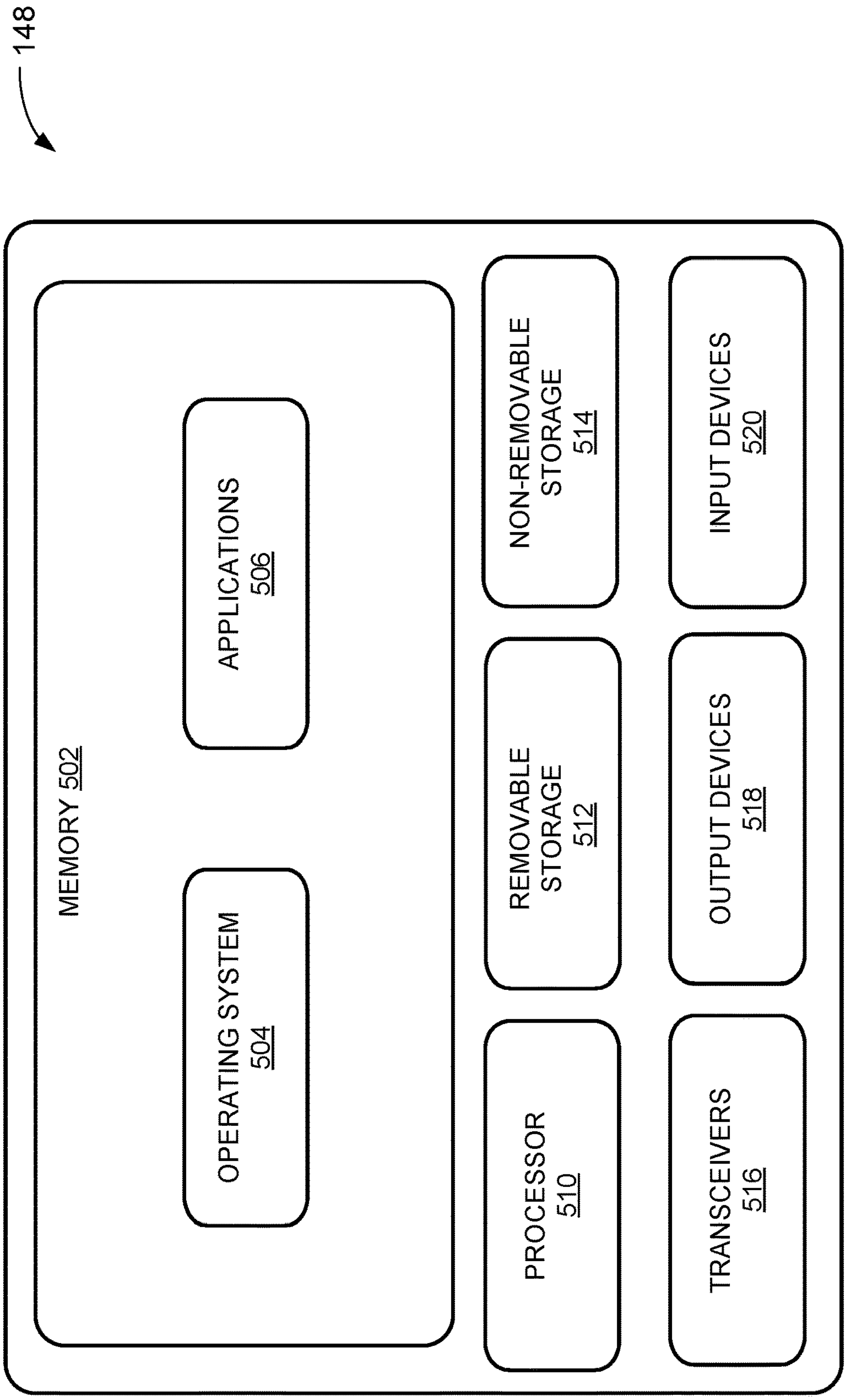
FIG. 5 depicts a component level view of a controller for use with the systems and methods described herein, in accordance with various examples of the presently disclosed subject matter.

FIG. 5 depicts a component level view of the controller 148 for use with the systems and methods described herein, in accordance with various examples of the presently disclosed subject matter. The controller 148 could be any device capable of providing the functionality associated with the systems and methods described herein. The controller 148 can comprise several components to execute the above-mentioned functions. The controller 148 may be comprised of hardware, software, or various combinations thereof. As discussed below, the controller 148 can comprise memory 502 including an operating system (OS) 504 and one or more standard applications 506.

The controller 148 can also comprise one or more processors 510 and one or more of removable storage 512, non-removable storage 514, transceiver(s) 516, output device(s) 518, and input device(s) 520. In various implementations, the memory 502 can be volatile (such as random access memory (RAM)), non-volatile (such as read only memory (ROM), flash memory, etc.), or some combination of the two. The memory 502 can include data and can be stored on a remote server or a cloud of servers accessible by the controller 148.

The memory 502 can also include the OS 504. The OS 504 varies depending on the manufacturer of the controller 148. The OS 504 contains the modules and software that support basic functions of the controller 148, such as scheduling tasks, executing applications, and controlling peripherals. The OS 504 can also enable the controller 148 to send and retrieve other data and perform other functions, such as transmitting control signals using the transceivers 516 and/or output devices 518 and receiving signals using the input devices 520.

The controller 148 can also comprise one or more processors 510. In some implementations, the processor(s) 510 can be one or more central processing units (CPUs), graphics processing units (GPUs), both CPU and GPU, or any other combinations and numbers of processing units. The controller 148 may also include additional data storage devices (removable and/or non-removable) such as, for example, magnetic disks, optical disks, or tape. Such additional storage is illustrated in FIG. 5 by removable storage 512 and non-removable storage 514.

Non-transitory computer-readable media may include volatile and nonvolatile, removable and non-removable tangible, physical media implemented in technology for storage of information, such as computer readable instructions, data structures, program modules, or other data. The memory 502, removable storage 512, and non-removable storage 514 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the controller 148. Any such non-transitory computer-readable media may be part of the controller 148 or may be a separate database, databank, remote server, or cloud-based server.

In some implementations, the transceiver(s) 516 include any transceivers known in the art. In some examples, the transceiver(s) 516 can include wireless modem(s) to facilitate wireless connectivity with other components (e.g., between the controller 148 and a wireless modem that is a gateway to the Internet), the Internet, and/or an intranet. Specifically, the transceiver(s) 516 can include one or more transceivers that can enable the controller 148 to send and receive data. It should be noted that although communications between the controller 148 and other components may be illustrated with lines, the communications may be wired or wireless. Thus, the transceiver(s) 516 can include multiple single-channel transceivers or a multi-frequency, multi-channel transceiver to enable the controller 148 to send and receive video calls, audio calls, instructions, signals, messaging, and the like. The transceiver(s) 516 can enable the controller 148 to connect to multiple networks including, but not limited to 2G, 3G, 4G, 5G, and Wi-Fi networks. The transceiver(s) 516 can also include one or more transceivers to enable the controller 148 to connect to future (e.g., 6G)

networks, Internet-of-Things (IoT), machine-to machine (M2M), and other current and future networks.

The transceiver(s) 516 may also include one or more radio transceivers that perform the function of transmitting and receiving radio frequency communications via an antenna (e.g., Wi-Fi or Bluetooth®). In other examples, the transceiver(s) 516 may include wired communication components, such as a wired modem or Ethernet port, for communicating via one or more wired networks. The transceiver(s) 516 can enable the controller 148 to facilitate audio and video calls, download files, access web applications, and provide other communications associated with the systems and methods, described above.

In some implementations, the output device(s) 518 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 518 can also include speakers, or similar devices, to play sounds or ringtones when an audio call or video call is received. Output device(s) 518 can also include ports for one or more peripheral devices, such as headphones, peripheral speakers, or a peripheral display.

In various implementations, input device(s) 520 include any input devices known in the art. For example, the input device(s) 520 may include a camera, a microphone, or a keyboard/keypad. The input device(s) 520 can include a touch-sensitive display or a keyboard to enable users to enter data and make requests and receive responses via web applications (e.g., in a web browser), make audio and video calls, and use the standard applications 506, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 520 and an output device 518.

INDUSTRIAL APPLICABILITY

The present disclosure relates generally to purging a fuel from one or more parts of an engine. In various uses, it may be required or desired to remove at least a portion of a fuel from an engine for various reasons. For example, the fuel may be corrosive, whereby allowing the fuel to remain in contact with various parts of an engine may degrade the engine parts. In another example, the fuel may be a safety hazard that, if left within the engine, can endanger personnel using the engine. In engines that a purge operation is to be used, a nitrogen source may purge a portion of the engine, while leaving the fuel within the remaining portions of the engine. Thus, in various examples of the presently disclosed subject matter, the use of the air that is used by the engine during operation can purge the engine more proximate to the cylinders than what may be achievable using a separate air source. Further, using systems and components already installed on the engine, such as a turbocharger, a separate source of high-pressure gas may not be needed in order to achieve a purge operation. In some examples, using previously installed engine components can reduce the weight of the engine and reduce costs.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. An internal combustion engine system, comprising:
- an internal combustion engine configured to combust diesel fuel and a second fuel;
- a compressor configured to provide a compressed intake air to an intake manifold of the internal combustion engine as part of combustion within a cylinder of the internal combustion engine;
- a first fuel pump configured to pump a first fuel from a first fuel tank to a first fuel injector for providing the first fuel, when the first fuel injector is open, to the cylinder;
- a second fuel pump configured to pump a second fuel from a second fuel tank to a second fuel injector for providing the second fuel, when the second fuel injector is open, to the intake manifold and into the cylinder for combustion; and
- a controller configured to:
  - receive a purge event notice; and
  - upon receiving the purge event notice, detect when a differential pressure between the second fuel and the compressed intake air is at or below a value, wherein the value is calculated as a difference between a pressure of the second fuel prior to the second fuel injector and a pressure of the compressed intake air; and
  - open the second fuel injector when the differential pressure between the second fuel and the compressed intake air is at or below a value to allow the compressed intake air to perform a purge operation to purge at least a portion of the second fuel from the internal combustion engine into the second fuel tank.

2. The internal combustion engine system of claim 1, wherein the second fuel comprises methanol, ethanol, n-propyl alcohol, isopropyl alcohol, or t-butyl alcohol.

3. The internal combustion engine system of claim 1, wherein the first fuel is diesel fuel.

4. The internal combustion engine system of claim 1, wherein the controller is further configured to cause the second fuel pump to deenergize to reduce the differential pressure between the second fuel and the compressed intake air to the value or below the value.

5. The internal combustion engine system of claim 1, wherein the controller is further configured to, during the purge operation:
- detect that the internal combustion engine is in an air intake cycle;
- cause the second fuel injector to close during the air intake cycle;
- detect that the internal combustion engine has completed the air intake cycle; and
- cause the second fuel injector to reopen.

6. The internal combustion engine system of claim 1, wherein the purge event notice comprises an engine shutdown signal indicating that the internal combustion engine is shutting down.

7. The internal combustion engine system of claim 1, wherein the purge event notice comprises an indication that the second fuel pump has shutdown.

8. The internal combustion engine system of claim 1, further comprising an air intake sensor to detect the pressure of the compressed intake air and a second fuel pressure sensor to detect the pressure of the second fuel prior to the second fuel injector.

9. A controller for controlling a purge operation of an internal combustion engine, the controller comprising:

a memory storing computer-executable instructions; and a processor in communication with the memory, the computer-executable instructions causing the processor to perform acts comprising:

receiving a purge event notice of the internal combustion engine configured to combust a first fuel, a second fuel, or mixtures thereof, wherein the purge event notice is an indication to the controller to cause the purging of at least a portion of the second fuel from the internal combustion engine;

determining a differential pressure between the second fuel and a compressed intake air is at or below a value, wherein the value is calculated as a difference between a pressure of the second fuel prior to a second fuel injector and a pressure of the compressed intake air; and upon determining that the differential pressure is at or below the value, performing a purge operation by opening a second fuel injector to allow the compressed intake air to purge at least a portion of the second fuel from the internal combustion engine into a second fuel tank.

10. The controller of claim 9, wherein the second fuel comprises methanol, ethanol, n-propyl alcohol, isopropyl alcohol, or t-butyl alcohol.

11. The controller of claim 9, wherein the computer-executable instructions further comprise instructions to cause the processor to perform the act comprising issuing a pump control signal to deenergize the second fuel pump to reduce the differential pressure between the second fuel and the compressed intake air to the value or below the value.

12. The controller of claim 9, wherein the computer-executable instructions further comprise instructions to cause the processor, during the purge operation, to perform the acts comprising:

detecting that the internal combustion engine is in an air intake cycle;

causing the second fuel injector to close during the air intake cycle;

detecting that the internal combustion engine has completed the air intake cycle; and causing the second fuel injector to reopen.

13. The controller of claim 9, wherein the purge event notice comprises an engine shutdown signal indicating that the internal combustion engine is shutting down.

14. The controller of claim 9, wherein the purge event notice comprises an indication that the second fuel pump has shutdown.

15. The controller of claim 9, wherein the computer-executable instructions further comprise instructions to cause the processor, during the purge operation, to perform the act comprising completing the purge operation by issuing a cutoff signal to close a second fuel cutoff valve to fluidically disconnect the second fuel from the internal combustion engine.

16. The controller of claim 9, wherein the compressed intake air is provided by a compressor of a turbocharger, wherein a turbine of the turbocharger receives combustion exhaust from the internal combustion engine to cause the compressor to compress air.

17. A method of purging an internal combustion engine, comprising:

receiving a purge event notice of the internal combustion engine configured to combust a first fuel, a second fuel, or mixtures thereof, wherein the purge event notice is an indication to a controller to cause the purging of at least a portion of the second fuel from the internal combustion engine;

determining a differential pressure between the second fuel and a compressed intake air is at or below a value, wherein the value is calculated as a difference between a pressure of the second fuel prior to a second fuel injector and a pressure of the compressed intake air; and upon determining that the differential pressure is at or below the value, performing a purge operation by opening a second fuel injector to allow the compressed intake air to purge at least a portion of the second fuel from the internal combustion engine into a second fuel tank.

18. The method of claim 17, wherein the first fuel comprises diesel fuel and the second fuel comprises methanol.

19. The method of claim 17, further comprising completing the purge operation by closing a second fuel cutoff valve to fluidically disconnect the second fuel from the internal combustion engine.

20. The method of claim 17, further comprising deenergizing the second fuel pump to reduce the differential pressure between the second fuel and the compressed intake air to the value or below the value.

* * * * *